United States Patent [19]
Yamashina et al.

[11] Patent Number: 5,361,111
[45] Date of Patent: Nov. 1, 1994

[54] LENS-FITTED PHOTOGRAPHIC FILM UNIT WITH MEANS PREVENTING UNINTENDED ACTUATION OF PUSHBUTTONS

[75] Inventors: Yasuhiro Yamashina; Takuya Arai, both of Kanagawa; Junichi Takagi, Saitama, all of Japan

[73] Assignee: Fuji Photo Film Co., Ltd., Kanagawa, Japan

[21] Appl. No.: 958,171

[22] Filed: Oct. 8, 1992

[30] Foreign Application Priority Data

Oct. 8, 1991 [JP] Japan .................................. 3-289316

[51] Int. Cl.⁵ ........................................... G03B 17/38
[52] U.S. Cl. .................. 354/266; 354/127.1; 354/288; 354/486

[58] Field of Search ............ 354/486, 266, 288, 127.1, 354/127.11, 127.12, 268

[56] References Cited

U.S. PATENT DOCUMENTS 4,278,337 7/1981 Mashimo .......................... 354/486 X
5,047,792 9/1991 Asano et al. .................... 354/149.11

Primary Examiner—Howard B. Blankenship
Attorney, Agent, or Firm—Young & Thompson

[57] ABSTRACT

A lens-fitted photographic film unit has a pushbutton such as a flash button or a shutter release button. The pushbutton is formed integrally with a front wall of the film unit but partially separated therefrom by a slit. The pushbutton is surrounded by a ridge-shaped barrier which prevents it from being accidentally depressed by neighboring articles. The barrier projects outwardly from the front wall.

11 Claims, 3 Drawing Sheets

LENS-FITTED PHOTOGRAPHIC FILM UNIT WITH MEANS PREVENTING UNINTENDED ACTUATION OF PUSHBUTTONS

BACKGROUND OF THE INVENTION

1. Field of the Invention

The present invention relates to a lens-fitted photographic film unit which has a photographic film contained therein and is equipped with a taking lens and a shutter mechanism.

2. Description of the Prior Art

Lens-fitted photographic film units (hereinafter referred to simply as film units) have been widely used due to their simplicity. Such film units can be purchased at nearly any store, and it is possible to take photographs instantly without making any advance preparation. After all frames of such a film unit are exposed, the film unit is forwarded to a photofinishing laboratory. In the photofinishing laboratory, the exposed photographic film is removed from the film unit and subjected to developing and printing processes. Then, the developed photographic film and resultant photoprints are returned to the customer. In these circumstances, it is necessary to make the film units as inexpensively as possible. At present, the film housing of the film unit, which contains a photographic film and is equipped with a taking lens and a shutter mechanism, is formed of plastic and encased in an outer casing formed of cardboard. The outer casing is formed with openings to expose the taking lens, a rear finder window, a front finder window, a shutter release button, a flash window, a film advancing wheel, etc. Therefore, it is possible to take photographs without ever removing the film housing from the outer casing.

Thus, when taking photographs, the shutter release button is depressed through the corresponding opening of the outer casing. If an object is low in brightness, the shutter release button is depressed only after a flash device is first charged by depressing a flash button. The outer casing is provided with a channel-shaped slit whose shape corresponds to the outline of the flash button, so that the flash button can be depressed with ease by pushing down on the overlying portion of the outer casing. These buttons are formed integrally with a front cover which is a part of the film housing. The front cover has a channel-shaped slit, and a tongue-shaped area surrounded by the slit serves as the flash button. According to this construction, there is no need to incorporate a separate part for the flash button into the film housing, and also there is no need to incorporate a spring for returning the flash button to its initial position since the plastic of the tongue-shaped area has inherent elasticity.

Since the flash button is formed by providing the slit in the front cover as mentioned above, the flash button at its initial position is located in the same plane as the outer surface of the front cover. Accordingly, for example when carrying the film unit in a bag, there is a danger that other articles in the bag may collide with the flash button and cause unintended depression of the flash button. In such a case, charging occurs, which runs down the dry-cell battery. When the shutter release button is formed in the same manner as the flash button, it is subject to the same unintended actuation.

SUMMARY OF THE INVENTION

It is therefore an object of the present invention to provide a lens-fitted photographic film unit whose pushbuttons are formed integrally with flat surfaces of a film housing, but which are not subject to accidental actuation.

To achieve the above and other objects and advantages of the invention, a barrier is formed on a wall of a lens-fitted photographic film unit so as partially to surround the pushbutton. The pushbutton is formed of plastic integrally with the wall, but separated from the wall by a channel-shaped slit. According to the present invention, the barrier prevents articles from colliding with and accidentally depressing the pushbutton. Consequently, an unintended shutter release and flash emission can be prevented.

BRIEF DESCRIPTION OF THE DRAWINGS

The above and other features and advantages of the present invention will be more readily apparent from the following detailed description when read in connection with the accompanying drawings, in which.

DETAILED DESCRIPTION OF THE PREFERRED EMBODIMENTS

Figure 1:
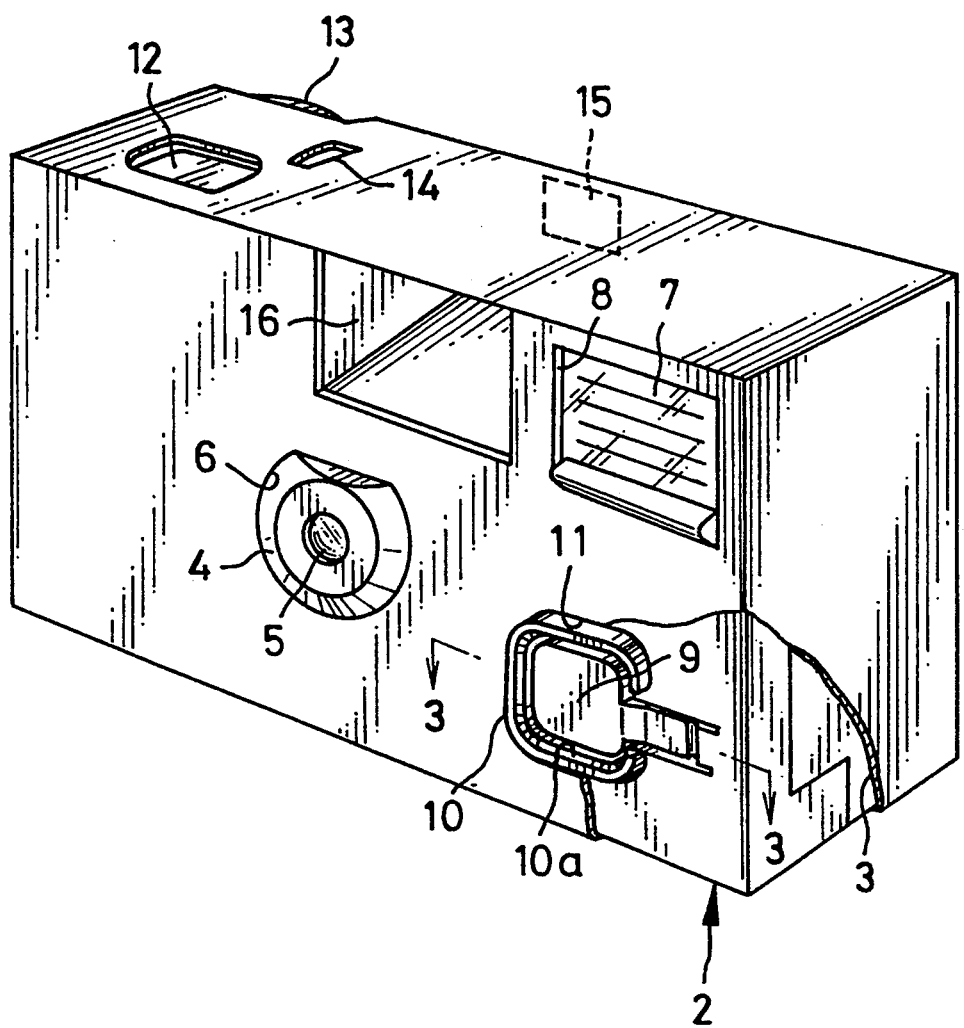
FIG. 1 is a perspective view of a lens-fitted photographic film unit of a preferred embodiment of the present invention.

In FIG. 1, a lens-fitted photographic film unit comprises a film housing 2 and an outer casing 3 which is shown partially torn away. The outer casing 3 is provided with an opening 6 for exposing a protruding portion 4 and a taking lens 5, an opening 8 for a flash window 7, an opening 11 for a flash button 9 and a barrier 10 surrounding the flash button 9, and further unnumbered openings for a shutter button 12, a film advancing wheel 13, a film frame counter window 14, a rear finder window 15 and a front finder window 16. Therefore, it is possible to take photographs with the film housing 2 encased in the outer casing 3. The outer casing 3 has illustrations and information printed on its external surface so as to impart a decorative appearance to the film unit.

Figure 2:
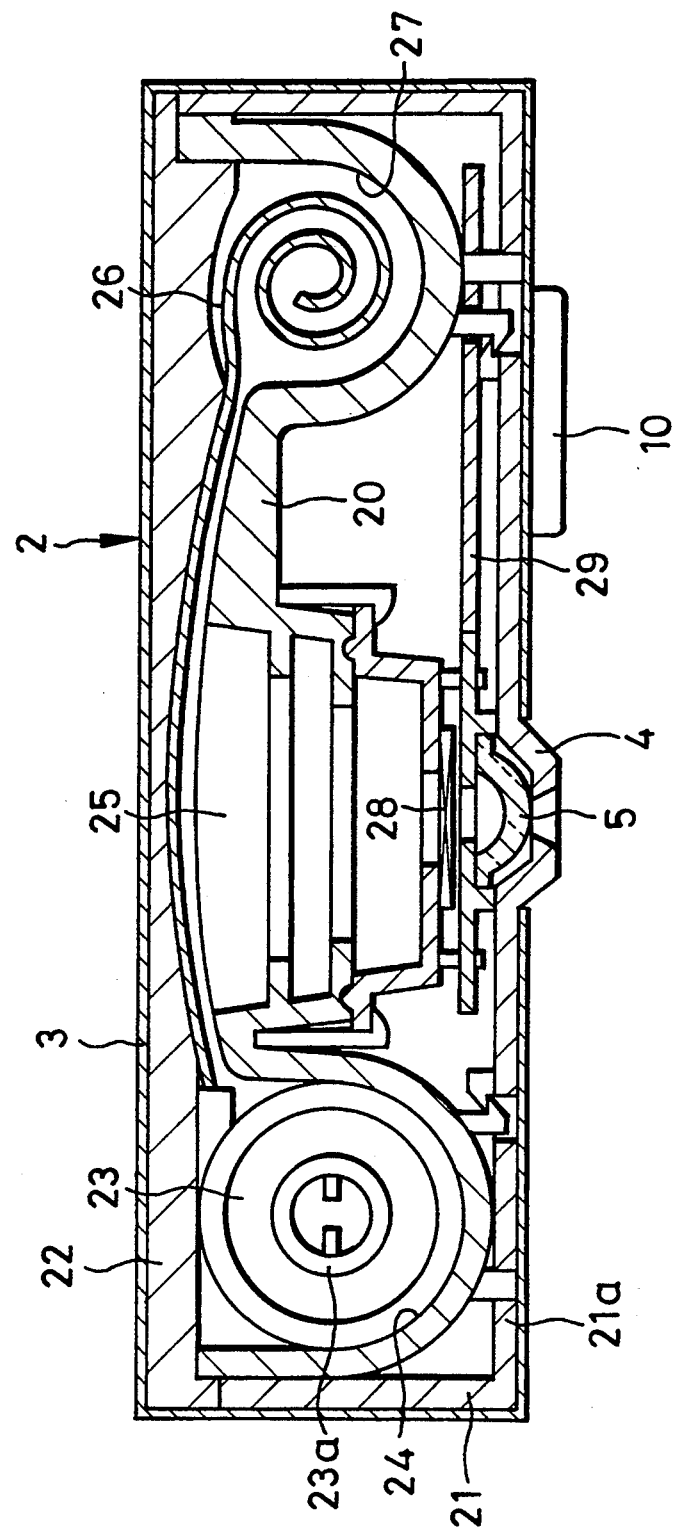
FIG. 2 is a transverse cross section of the film unit of FIG. 1.

In FIG. 2, the film housing 2 is shown to consist of a main body 20, a front cover 21 and a rear cover 22. The main body 20 has an exposure opening 25, a film take-up chamber 24 for accommodating a photographic film cartridge 23 and a film supply chamber 27 for accommodating a roll of unexposed photographic film 26 formed after having been withdrawn from the photographic film cassette 23. By rotating the film advance wheel 13, a spool 23a of the photographic film cartridge 23 is rotated to rewind the exposed frames of the photographic film 26 into the photographic film cartridge 23. Upon depression of the shutter release button 12, a shutter 28 is actuated to cause light passing through the taking lens 5 to be incident on the photographic film 26. The shutter 28 is cocked by that movement of the photographic film which occurs as the film advance wheel 13 is turned an amount corresponding to one frame.

Reference numeral 29 designates a printed circuit board of a flash device.

Figure 3:
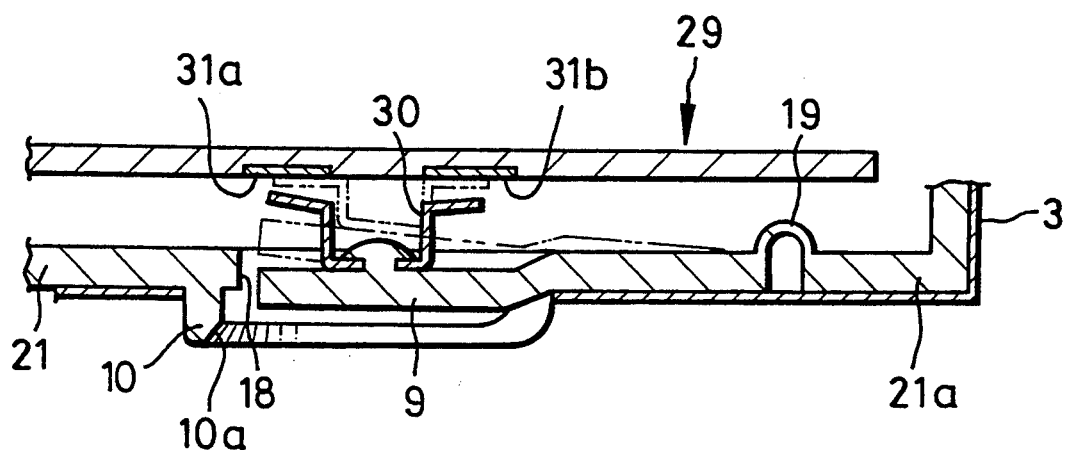
FIG. 3 is a partial cross section of the film unit along line 3—3 of FIG. 1.

In FIG. 3, illustrating a cross section taken along line 3—3 of FIG. 1, the flash button 9 is formed of plastic integrally with a front wall 21a of the front cover 21. The flash button 9 is partially separated from the front wall 21a by a channel-shaped slit 18, and has an indented portion 19 at its root. The indented portion 19 is in a semicircular shape and formed thinly relative to the remainder of wall 21a. A conductor element 30 is secured to the inside surface of the flash button 9 by thermal caulking to face a pair of electrodes 31a, 31b formed on the printed circuit board 29.

The barrier 10 project alongside the slit 18 and is formed integrally with the front wall 21a so as to surround the flash button 9. When depressing the flash button 9, the photographer's fingertip is nested conveniently within the barrier 10 owing to the inclined surface 10a which facilitates the depressing operation.

Prior to actuation, the flash button 9 occupies the position shown in solid line in FIG. 3, and the front surface of the flash button 9 is recessed relative to the barrier 10. If the film unit is carried about in a bag, or if a collection of the film units is kept randomly heaped up in a bin in a shop, the barrier 10 prevents the flash button 9 from being depressed by articles surrounding the flash button 9.

It would be possible to protect the flash button 9 by recessing the flash button 9 relative to the outer surface of the front wall 21a instead of providing the barrier 10. However, to sink the flash button 9 sufficiently, metal molds having complicated structures would be required and in addition the number of metal molds might need to be increased. On the other hand, it is sufficient to use simple metal molds to provide the barrier 10 integrally on the outer surface of the front wall 21a.

The flash button 9 is depressed for flash photography. At this time, since the barrier 10 is provided with the inclined surface 10a, the photographer's fingertip is positioned conveniently on the flash button 9, which makes it possible to operate the flash button 9 stably. When the flash button 9 is depressed against the inherent elasticity of its plastic, the flash button 9 is bent inward from the indented portion 19, as indicated by the phantom line in FIG. 3. Thereby, the conductor element 30 secured to the rear surface of the flash button 9 is brought into contact with the electrodes 31a, 31b to charge a main capacitor (not shown) of the flash device. When the shutter release button 12 is depressed after completion of charging, a flash photograph is taken.

Figure 4:
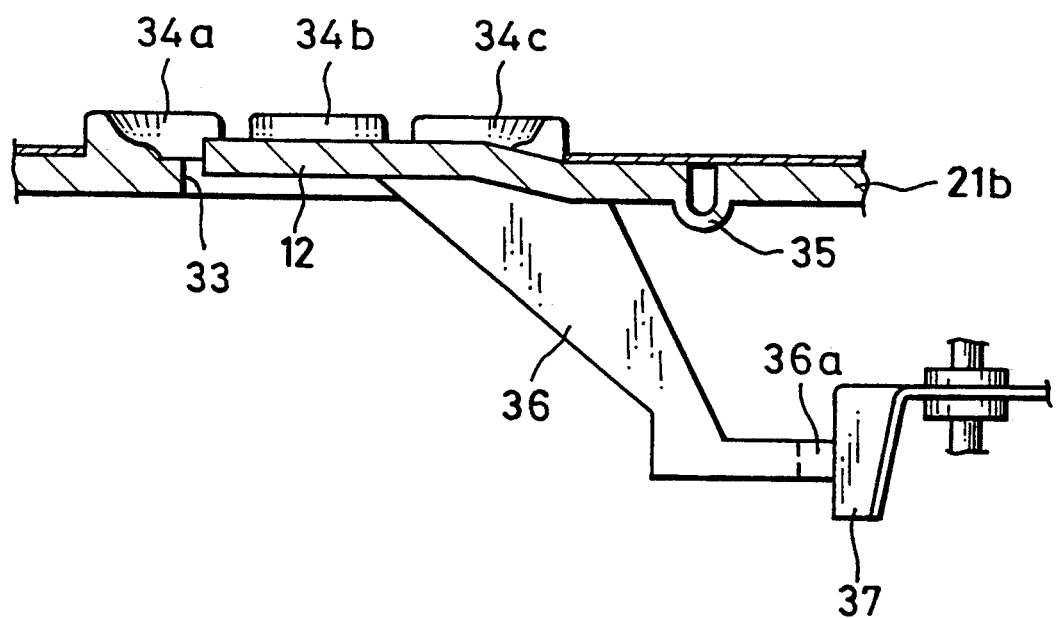
FIG. 4 is a partial cross section illustrating another preferred embodiment according to the present invention.

FIG. 4 illustrates another preferred embodiment, wherein the present invention is applied to the shutter release button 12. The shutter release button 12 is formed integrally with an upper wall 21b of the front cover 21 and separated partially therefrom by a channel-shaped slit 33, the same as for the shutter release button 12. A plurality of barriers 34a to 34c are formed on the upper wall 21b proximate to the slit 33 so as to surround the shutter release button 12. The shutter release button 12 is formed integrally with a lever 36 whose cam end 36a is in contact with a side face of a release lever 37. When the shutter release button 12 is depressed from above, it is bent downward about an indented portion 35 to cause the cam end 36a of the lever 36 to rotate a release lever 37 for a shutter release.

In this embodiment the barriers 34a to 34c are separated by spacings, but perform the same function as the barrier 10 in the above-described embodiment as long as the respective spacings are not overly wide. Accordingly, the shutter release button 12 will not be depressed inadvertently by neighboring articles.

The present invention may be applied to a film unit in which a flash button and a shutter release button are operated by depressing overlying portions of an outer casing, which overlying portions are delimited by channel-shaped slits formed in the outer casing. In that case, a barrier may be exposed through a corresponding slit formed in the outer casing, or may be concealed completely by the outer casing. The present invention may also be applied to a film unit with no outer casing.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as being included therein.

What is claimed is:

1. A lens-fitted photographic film unit containing a photographic film and being adapted to take photographs, comprising:

at least one plastic pushbutton formed integrally with a wall of said film unit, only a portion of said pushbutton being separated from said wall by a slit which surrounds most but not all of said pushbutton, said pushbutton being connected to said film unit by an integral bridge, said pushbutton being adapted to be depressed inwardly of the wall from an initial position and to move back outwardly to said initial position when released; and a barrier formed on an outer surface of said wall surrounding said pushbutton only partially, said barrier projecting outwardly relative to an actuating surface of said pushbutton when said pushbutton is in said initial position, said barrier terminating in two ends disposed on opposite sides of said bridge.

2. The lens-fitted photographic film unit as recited in claim 1, wherein said barrier has a ridge-like shape.

3. The lens-fitted photographic film unit as recited in claim 1, wherein said barrier has an obliquely inclined surface on an inner side facing said pushbutton.

4. The lens-fitted photographic film unit as recited in claim 1, wherein said pushbutton comprises an indented portion on said bridge so as to allow said pushbutton to deflect easily when said pushbutton is depressed.

5. The lens-fitted photographic film unit as recited in claim 4, wherein said indented portion is formed relatively more thin than said wall.

6. The lens-fitted photographic film unit as recited in claim 1, wherein said pushbutton is a flash button.

7. The lens-fitted photographic film unit as recited in claim 6, wherein a conductor is secured to an inside surface of said pushbutton and is so disposed as to be brought into contact with a pair of contact points to turn on a switch consisting of said conductor and said pair of contact points when said pushbutton is depressed.

8. The lens-fitted photographic film unit as recited in claim 1, wherein said pushbutton is a shutter release button.

9. The lens-fitted photographic film unit as recited in claim 1, wherein said barrier is divided into a plurality of spaced elements.

10. The lens-fitted photographic film unit as recited in claim 1, wherein said bridge has a length in a direction toward and away from said pushbutton which is greater than either a width or a thickness of said bridge in a direction perpendicular to said length.

11. The lens-fitted photographic film unit as recited in claim 1, wherein both the pushbutton and the barrier are formed integrally with said wall of said film unit.

* * * * *